United States Patent Office 2,992,269
Patented July 11, 1961

2,992,269
MANUFACTURE OF CYCLOALKYL ESTERS
Bruce W. Horrom and Leo R. Swett, Waukegan, Ill.,
assignors to Abbott Laboratories, North Chicago, Ill.,
a corporation of Illinois
No Drawing. Filed Apr. 3, 1959, Ser. No. 803,834
6 Claims. (Cl. 260—468)

The present invention is concerned with an improved method for the manufacture of cycloalkyl esters corresponding to the formula

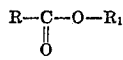

In this and succeeding formulas, R represents cycloalkyl or loweralkyl substituted cycloalkyl wherein the cycloalkyl ring contains from 3 to 4 carbon atoms, inclusive, and $R_1$ represents loweralkyl. The term "loweralkyl" as herein employed refers to the alkyl radicals containing from 1 to 2 carbon atoms, inclusive. These compounds are valuable intermediates for the preparation of more complex cycloalkyl derivatives and particularly for the production of cycloalkyl isopropylhydrazides. In such use, the cycloalkyl ester intermediate is reacted successively with hydrazine, acetone and hydrogen to form a compound of the formula

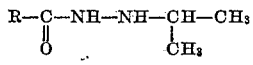

Such compounds are valuable as monoamine oxidase inhibitors.

Several methods for preparing the cycloalkyl esters are known. In one method, the compounds may be prepared by the reaction of a chlorobromoalkane with potassium cyanide to form a chlorocyanoalkane intermediate which is thereafter hydrolyzed to the corresponding cycloalkyl carboxylic acid. Further reaction with an alcohol in the presence of an acid catalyst results in the formation of the desired cycloalkyl ester. Details of this method are described in J.A.C.S., 53, 2791 (1931) and J.A.C.S., 63, 1733 (1941). In another method which is described in J.A.C.S., 43, 2097 (1921) and J.A.C.S., 71, 2941 (1949), the cyclopropyl esters are prepared by the reaction of ethylene dibromide with disodium ethyl malonate to obtain the intermediate cyclopropyl ethyl malonate which is then decarboxylated to form cyclopropyl carboxylic acid. Further reaction of the acid with an alcohol produces the desired ester. However, the known methods are cumbersome, time consuming and result in low yields of the desired cycloalkyl esters.

It is an object of the present invention to provide a new and improved method for the preparation of cycloalkyl and alkyl substituted cycloalkyl esters. Another object is to provide a method which gives increased yields of the cycloalkyl and alkylcycloalkyl esters. A further object is to provide a method which gives cyclopropyl and cyclobutyl esters in a greater yield than has previously been obtainable by known methods. Other objects will appear throughout the following specifications and appended claims.

The new and improved process comprises reacting in an inert, anhydrous medium an alkali metal hydride and a compound of the formula

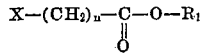

or mixtures thereof, wherein n is an integer from 3 to 6, inclusive, and X is chlorine, bromine or iodine. The reaction is carried out in benzene, toluene, ethylene dichloride or other inert, anhydrous, organic solvents. The reaction takes place smoothly and conveniently at the boiling temperature of the reaction mixture with the production of the desired products in high yields. Sodium hydride is the alkali metal hydride of choice from the standpoint of economy but the potassium, lithium, rubidium and cesium hydrides may be employed if desired. Upon completion of the reaction, water is added and the organic layer separated, dried and distilled at atmospheric pressure to obtain the desired cycloalkyl ester products as colorless liquids. This new process gives greater yields of the cycloalkyl and alkylcycloalkyl esters than have previously been obtained by known methods.

When the alkylchloroalkanoates or alkylbromoalkanoates are employed as starting materials, it is convenient to store them over an alkali metal iodide, preferably potassium iodide, for a period of from 3 to 12 hours to partially convert said alkanoates to the alkyliodoalkanoates, which are much more reactive. The amount of alkali metal iodide used is not critical but good results are obtained when approximately 4 grams of alkali metal iodide are employed with each mole of alkylchloroalkanoate or alkylbromoalkanoate.

In carrying out the method if the present invention, the alkylhaloalkanoate is added dropwise with stirring to a suspension of the alkali metal hydride in dry benzene or other suitable, inert, anhydrous medium and the resulting mixture heated preferably at the boiling temperature and under reflux for a period of time to complete the reaction. If desired the order of addition of the reactants may be reversed. Good results are obtained when employing substantially equimolecular proportions of alkali metal hydride and alkylhaloalkanoate. Upon completion of the reaction, the reaction mixture is cooled, diluted with water and the organic layer separated, dried and distilled to obtain the desired cycloalkyl or alkylcycloalkyl ester.

The following examples illustrates the invention but are not to be construed as a limitation thereof.

*Example I*

Ethylcyclopropanecarboxylate

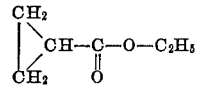

To a suspension of 32 grams (1.33 mole) of sodium hydride in 600 ml. of dry benzene was added dropwise with stirring 184.5 grams (1.23 mole) of ethylgammachlorobutyrate which had been stored overnight with 4 grams potassium iodide. The resulting mixture was thereafter refluxed overnight. Upon completion of the reaction, the reaction mixture was cooled and diluted with 150 ml. of water. The organic layer was then separated, dried and distilled to obtain 169.3 grams (78% yield) of the desired ethylcyclopropanecarboxylate as a colorless liquid boiling at 132°–134° C. at atmospheric pressure and having a refractive index $n/D$ of 1.4174 at 25° C.

*Example II*

Ethyl-2-methylcyclopropylcarboxylate

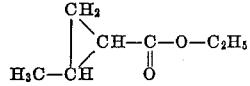

50.7 grams (0.31 mole) of ethylgammachlorovalerate was stored over one gram of potassium iodide for 3 hours and thereafter added dropwise to a stirred suspension of 8.0 grams (0.33 mole) of sodium hydride in 250 ml. of dry benzene. The resulting mixture was heated at the boiling temperature and under reflux overnight. When the reaction was complete, the reaction mixture was processed as described in Example I to obtain 24.5 grams (62.1% yield) of the desired ethyl-2-methylcyclopropylcarboxylate as a colorless liquid boiling at 145°–150° C. at atmospheric pressure and having a refractive index n/D of 1.4187 at 25° C.

*Example III*

Methylcyclobutanecarboxylate

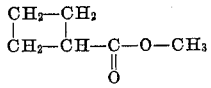

This compound is prepared in high yield by the reaction of equimolecular proportions of potassium hydride and methyldeltabromovalerate after storage of the latter compound over 4 grams of sodium iodide for a period of 12 hours. The reaction conditions and isolation of the product are as described in Example 1. Methylcyclobutanecarboxylate has a molecular weight of 114 and boils at 134.5° C. at atmospheric pressure.

In a similar manner, the method of the present invention may be employed to obtain the very desirable and improved yields of other cycloalkyl esters as follows:

Methyl-2-methylcyclopropanecarboxylate by the reaction of sodium hydride and a mixture of methylgammachlorovalerate and methylgammaiodovalerate.

Ethyl-3-ethylcyclobutanecarboxylate by the reaction of potassium hydride and a mixture of ethyldeltabromoheptanoate and ethyldeltaiodoheptanoate.

Ethyl-2-ethylcyclopropanecarboxylate by the reaction of lithium hydride and ethylgammaiodohexanoate.

Methyl-2-methylcyclobutylcarboxylate by the reaction of cesium hydride and methyldeltabromohexanoate.

Methylcyclopropanecarboxylate by the reaction of rubidium hydride and methylgammachlorobutyrate.

Ethylcyclobutanecarboxylate by the reaction of sodium hydride and ethyldeltaiodovalerate.

What we claim is:

1. A method for the manufacture of a compound corresponding to the formula

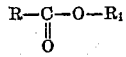

wherein R is a member of the group consisting of cyclopropyl, cyclobutyl, loweralkylcyclopropyl and loweralkylcyclobutyl and $R_1$ is loweralkyl which comprises refluxing in an inert, anhydrous organic solvent an alkali metal hydride and a loweralkylhaloalkanoate selected from the group consisting of loweralkylgammahaloalkanoates and loweralkyldeltahaloalkanoates, wherein the halogen is selected from the group consisting of chlorine and bromine in the presence of a catalytic amount of potassium iodide, and recovering the resulting product from the reaction mixture.

2. A method as claimed in claim 1 wherein substantially equimolecular proportions of the reactants are employed.

3. A method as claimed in claim 2 in which the alkali metal hydride employed is sodium hydride and the loweralkylhaloalkanoate is ethylgammacholorbutyrate.

4. A method as claimed in claim 2 in which the alkali metal hydride employed is sodium hydride and the loweralkylhaloalkanoate is ethylgammachlorovalerate.

5. A method as claimed in claim 2 in which the alkali metal hydride employed is sodium hydride and the loweralkylhaloalkanoate is ethylgammabromobutyrate.

6. A method as claimed in claim 2 in which the alkali metal hydride employed is sodium hydride and the loweralkylhaloalkanoate is methyldeltabromovalerate.

References Cited in the file of this patent

Blomquist et al.: J. Org. Chem., 21, 1371–3 (1956).
Organic Reactions, vol. IX—pp. 116, 118 and 135, J. Wiley, 1957.